Patented Dec. 7, 1948

2,455,398

UNITED STATES PATENT OFFICE 2,455,398

MEDICINAL COMPOSITION FOR HEMORRHAGIC CONDITIONS

Stefan Ansbacher, Rockville Centre, N. Y., and Erhard Fernholz, deceased, late of Princeton, N. J., by Mary Briganti Fernholz, administratrix, New York, N. Y., assignors to E. R. Squibb & Sons, New York, N. Y., a corporation of New York No Drawing. Original application July 29, 1939, Serial No. 287,256. Divided and this application December 6, 1945, Serial No. 633,257

5 Claims. (Cl. 167—81)

This application is a division of application Serial No. 287,256, filed July 29, 1939.

This invention relates to, and has for its object the provision of, medicinal agents for hemorrhagic conditions, particularly those associated with lowered prothrombin level.

It is known that a deficiency of the accessory food factor vitamin K results in diminution of the prothrombin content or activity of the blood and consequently increases the clotting time of the blood and facilitates development of hemorrhagic conditions. Vitamin K has been concentrated and isolated from natural sources such as alfalfa, and clinical administration has amply demonstrated its efficacy in raising the prothrombin level of the blood and hence its value for the treatment of hemorrhagic conditions such as those frequently arising in obstructive jaundice.

We have found that a group of chemical compounds (many of which are known) is highly efficacious in raising the prothrombin level of the blood and hence are valuable substitutes for vitamin K. This group consists of 2-methyl-1,4-naphthoquinone, 2-methyl-1,4-naphthohydroquinone [2-methyl-1,4-naphthalenediol], and esters of the latter, which compounds, notably 2-methyl-1,4-naphthoquinone and 2-methyl-1,4-naphthohydroquinone diacetate, are many times more active in raising the prothrombin level than vitamin $K_1$, the more active vitamin-K compound; and the hydroquinone esters enjoy the especial advantage of being administrable parenterally.

The compounds may be orally administered as such (i. e., in crystalline form) or in a suitable vehicle or carrier, advantageously in dosage-unit form (i. e., as tablets, capsules, or the like). For example, being fat-soluble, they are conveniently administrable in a fatty-oil medium, inter alia, olive oil, peanut oil, sesame oil, and fatty oils containing fat-soluble vitamins—especially such as coact with the compounds—e. g., cod-liver oil and halibut-liver oil; and the hydroquinone esters may be parenterally administered, for example by intramuscular injection of a solution thereof in a fatty oil, e. g., peanut oil. Thus, fatty-oil solutions containing 1 mg. of one of these compounds per c. c. and 0.25 c. c. capsules each containing 1 mg. of one of these compounds, have been successfully used for the treatment of hemorrhagic conditions resulting from lowered prothrombin level.

The esters of 2-methyl-1,4-naphthohydroquinone utilizable in the practice of this invention include, inter alia, the mono- and di-aliphatic acid (especially the lower fatty-acid) esters such as the monoacetate, the diacetate, the dipropionate, and the dibutyrate, and the mono- and di-aromatic acid esters such as the dibenzoate. The preparation of 2-methyl-1,4-naphthoquinone, 2-methyl-1,4-naphthohydroquinone, and the diacetate of the latter is described by R. J. Anderson and M. S. Newman, J. Biol. Chem., 103, 405 (1933); and other esters may of course be prepared in the same manner as the diacetate, using the desired-acid reactants, or by mono- or di-esterification of 2-methyl-1,4-naphthohydroquinone in the conventional manner.

The high potency of this group of compounds in raising the prothrombin level is indicated by the fact that to bring about normal clotting of the blood of a vitamin-K-deficient chick within six hours, the oral administration of 2 micrograms of vitamin $K_1$ (derived from alfalfa) in 0.1 cc. of cod-liver oil is required; whereas the same result may be obtained by the administration of, for example, 0.5 microgram of 2-methyl-1,4-naphthoquinone, likewise in 0.1 cc. cod-liver oil.

The efficacy of this group of compounds as medicinal (i. e., therapeutic and/or prophylactic) agents for hemorrhagic conditions associated with lowered prothrombin level has been demonstrated by clinical work. Thus, the oral administration of 1–4 mg. of one of these compounds in a fatty-oil (2-methyl-1,4-naphthoquinone in corn oil) brought about a normal prothrombin level of the blood within 24 hours in cases of obstructive jaundice; the oral administration of 1–4 mg. of one of these compounds in a fatty oil to expectant mothers within a few hours before delivery brought about a greatly elevated prothrombin level in the newborn; and the oral administration of 0.5–1 mg. of one of these compounds in a fatty oil to new born babies raised the prothrombin level considerably within a day.

The invention may be variously otherwise embodied, within the scope of the appended claims.

What is claimed is:

1. A medicinal composition for hemorrhagic conditions in dosage-unit form, comprising a carrier of the solid type and, as the added active medicament, about 1–4 mg. of an undissolved compound of the group consisting of 2-methyl-1,4-naphthoquinone, 2-methyl-1,4-naphthohydroquinone, and esters of the latter.

2. The composition defined in claim 1, wherein the dosage-unit form is a tablet.

3. A therapeutic composition comprising an undissolved compound of the group consisting of 2-methyl-1,4-naphthoquinone, 2-methyl-1,4-naphthohydroquinone, and esters of the latter, in a dosage-unit capsule.

4. A medicinal composition for hemorrhagic conditions, in dosage unit form, comprising a carrier of the solid type and, as an added active medicament, a medicinally-effective amount not over about 4 mg. of an undissolved compound of the group consisting of 2-methyl-1,4-naphthoquinone, 2-methyl-1,4-naphthohydroquinone, and esters of the latter.

5. A medicinal composition for hemorrhagic conditions, in dosage unit form, comprising a carrier of the solid type and, as an added active medicament, a medicinally-effective amount not over about 4 mg. of undissolved 2-methyl-1,4-naphthoquinone.

STEFAN ANSBACHER.
MARY BRIGANTI FERNHOLZ,
Administratrix of Estate of Erhard Fernholz, Deceased.

REFERENCES CITED

The following references are of record in the file of this patent:

UNITED STATES PATENTS

| Number | Name | Date |
|---|---|---|
| 1,984,511 | Anderson et al. | Dec. 18, 1934 |

OTHER REFERENCES

Fries et al., Berichte Chemische Gesellschaft, vol. 59, page 2919 (1921).

Journal of Biological Chemistry, vol. 103 (1933), pages 405 to 412.